Oct. 31, 1967 J. B. RINCKHOFF 3,350,169
PRODUCTION OF SULFURIC ACID
Filed Oct. 21, 1965
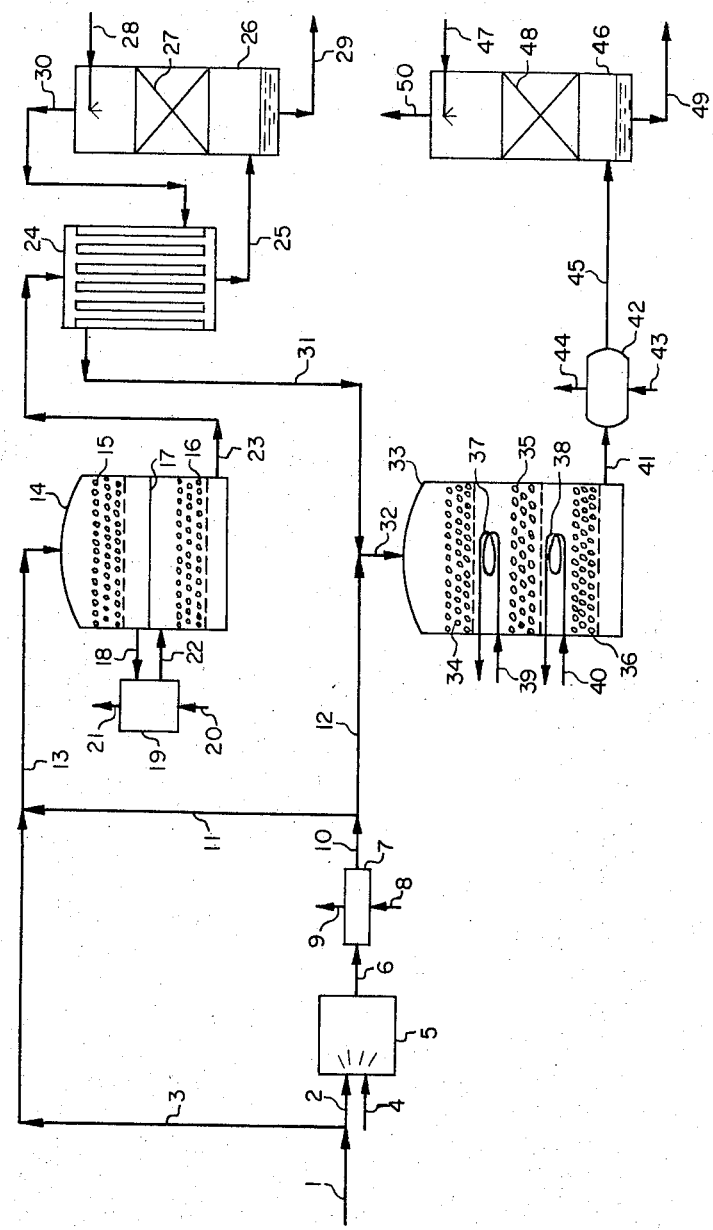
JOHN B. RINCKHOFF
INVENTOR.
BY J. T. Chaloty
AGENT

United States Patent Office 3,350,169
Patented Oct. 31, 1967

3,350,169
PRODUCTION OF SULFURIC ACID
John B. Rinckhoff, Westfield, N.J., assignor to Chemical Construction Corporation, New York, N.Y., a corporation of Delaware
Filed Oct. 21, 1965, Ser. No. 499,522
9 Claims. (Cl. 23—168)

ABSTRACT OF THE DISCLOSURE

Sulfuric acid is produced by dividing a sulfur dioxide-containing process gas stream into two portions. The first portion is subjected to catalytic oxidation of a portion of its sulfur dioxide content to sulfur trioxide. The partially converted gas stream is cooled, scrubbed with concentrated liquid sulfuric acid to remove sulfur trioxide as dissolved sulfuric acid, reheated, and combined with the second portion. The combined gas stream is subjected to complete catalytic oxidation of sulfur dioxide to sulfur trioxide, cooled, and scrubbed with concentrated liquid sulfuric acid to produce further dissolved sulfuric acid.

---

The present invention relates to the production of sulfuric acid. An improved processing sequence is provided, in which the sulfur dioxide-containing process gas stream is divided into two portions. A first portion is partially converted to sulfur trioxide, and the sulfur trioxide is absorbed in liquid sulfuric acid. The residual first portion is then combined with the second portion, and all of the sulfur dioxide in the combined gas stream is converted to sulfur trioxide, which is subsequently also absorbed in liquid sulfuric acid.

Numerous procedures have been developed for the production of sulfuric acid, all of which involve the basic sequence of combustion of a sulfur-containing feed stream to form a gas stream containing sulfur dioxide, cooling of the gas stream to optimum temperatures, catalytic oxidation of sulfur dioxide to sulfur trioxide, and absorption of the sulfur trioxide in concentrated sulfuric acid to form further sulfuric acid. The sulfur-containing feed stream may consist of elemental sulfur, hydrogen sulfide, pyrites or other sulfides, or sludge acid derived from petroleum refining. Elemental sulfur is the preferred raw material for large-scale commercial facilities, however the other sulfur sources mentioned supra may also be employed within the scope of the present invention. The oxidation of sulfur dioxide to sulfur trioxide is generally carried out in the presence of a vanadium or platinum catalyst, however other catalytic agents known to the art may also be employed in suitable instances. The oxidation reaction is strongly exothermic. Consequently, in order to avoid overheating of the catalyst, the reaction is generally carried out in a plurality of stages of partial conversion, with cooling of the gas stream being provided between stages. The resultant sulfur trioxide-containing gas stream is then absorbed in concentrated sulfuric acid, either to form further sulfuric acid or oleum, which consists of sulfuric acid containing excess dissolved sulfur trioxide. Both of these alternatives are encompassed within the scope of the present invention.

Numerous alternatives and modifications of the basic process sequence have been proposed in the prior art. Thus, in U.S. Patent No. 2,023,203, the hot sulfur dioxide-containing gas stream is split and a first portion is passed through a first converter for partial conversion with concomitant cooling. The balance of the hot sulfur dioxide-containing gas stream is then added, in order to compensate for possible over-cooling by providing a heating effect to attain optimum temperature for further conversion. The combined gas stream is then passed through two other conversion stages in series, followed by absorption of sulfur trioxide. In U.S. Patent No. 2,104,858, the sulfur dioxide-containing gas stream is cooled and divided into two portions. A first portion is then reheated to conversion temperature and subjected to partial catalytic conversion without cooling. The resultant hot gas stream is cooled by addition of the cold second portion of the sulfur dioxide-containing gas stream. Finally, U.S. Patent No. 1,789,460 provides a multi-stage sulfur dioxide conversion process in which a recycle gas stream is added to the main gas stream before each stage. The recycle gas stream consists of a portion of the main gas stream which is drawn off after the first stage of partial conversion, cooled, and scrubbed with a liquid absorbent for sulfur trioxide removal.

In the present invention, a sulfur-containing feed stream is burned with an oxygen-containing gas stream such as air or oxygen-enriched air, in order to produce a hot sulfur dioxide-containing gas stream which also contains excess free oxygen. The hot gas stream is produced at a temperature below 1200° C., in order to prevent furnace deterioration and also to avoid the fixation of atmospheric nitrogen which could result in stack fumes of nitrogen oxides and nitric acid in the product sulfuric acid. The hot gas stream is cooled and then divided into a first portion and a second portion. In one embodiment of the invention, additional air is added to the first gas stream portion, in order to reduce the sulfur dioxide content to less than 10%. The first portion is passed through a catalytic converter for the oxidation of sulfur dioxide to sulfur trioxide, and a major part of the sulfur dioxide content of the first gas stream portion is converted to sulfur trioxide. The resulting first gas stream portion is cooled and scrubbed with liquid sulfuric acid, which absorbs the sulfur trioxide content to form further sulfuric acid. The residual first gas stream portion is combined with the second gas stream portion, and the combined gas stream is passed through a second catalytic converter for the oxidation of sulfur dioxide to sulfur trioxide, in order to convert substantially all of the sulfur dioxide content to sulfur trioxide. The resulting converted combined gas stream is cooled and scrubbed with liquid sulfuric acid, which absorbs the sulfur trioxide content to form further sulfuric acid.

The process sequence of the present invention provides several practical advantages, as compared to the prior art. In actual application to a commercial sulfuric acid facility, the overall conversion of sulfur dioxide to sulfur trioxide was in excess of 99%, the required process air flow rate was only 50 cubic feet per minute per short ton of acid per day, and the total volume of vanadium catalyst required was only 117 liters per short ton of acid per day. Thus, the present invention provides a process sequence which features high overall conversion of sulfur dioxide to sulfur trioxide, low process air requirement, and low catalyst volume requirement.

It is an object of the present invention to produce sulfuric acid in an improved manner.

Another object is to produce sulfuric acid by dual absorption of sulfur trioxide.

A further object is to produce sulfuric acid by a process which is more efficient than prior art procedures, with respect to higher overall conversion of sulfur dioxide to sulfur trioxide, lower process air requirement, and lower catalyst volume requirement.

An additional object is to produce sulfuric acid from a sulfur dioxide-containing process gas stream by dividing the gas stream into two portions, partially converting the sulfur dioxide content of the first portion to sulfur trioxide, absorbing the sulfur trioxide in sulfuric acid in a first absorber, combining the residual first portion with the second portion, coverting the sulfur dioxide content of the combined gas stream to sulfur trioxide, and absorbing the sulfur trioxide from the combined gas stream into sulfuric acid in a second absorber.

An object is to produce a hot sulfur dioxide-containing gas stream by the combustion of a sulfur-containing feed stream with an oxygen-containing gas stream such as air, while preventing excessive temperature rise and the fixation of atmospheric nitrogen.

These and other objects and advantages of the present invention will become evident from the description which follows. Referring to the figure, process oxygen-containing gas stream 1 usually consists of atmospheric air which has preferably been pre-dried, usually by scrubbing with concentrated sulfuric acid, in order to prevent subsequent mist formation. Stream 1 is preferably divided into the main process air stream 2 and bypass air stream 3. Stream 2 is now reacted with sulfur-containing feed stream 4 in combustion furnace 5, which as described supra is maintained at a temperature below 1200° C. order to prevent furnace deterioration and the formation of nitrogen oxides by the fixation of atmospheric nitrogen. As described supra, stream 4 may consist of any of a variety of sulfur-containing materials, however stream 4 will usually consist of elemental sulfur in large-scale commercial facilities. The resultant sulfur-dioxide-containing gas stream 6 discharged from furnace 5 is thus at a temperature below 1200° C., and is preferably at a temperature in the range of 600° C. to 1200° C. Stream 6 usually contains in excess of 10% by volume of sulfur dioxide content together with excess free oxygen, and will preferably contain in the range of 10% to 14% sulfur dioxide content by volume.

Stream 6 is now cooled to a reduced temperature suitable for subsequent catalytic oxidation of sulfur dioxide to sulfur trioxide. The cooling of stream 6 preferably takes place in boiler 7, with concomitant steam generation. Liquid water stream 8 is passed into unit 7, and the resultant generated steam is removed from unit 7 as stream 9. The cooled process gas stream 10 removed from unit 7 is at a reduced temperature above 400° C. suitable for subsequent catalytic conversion, and is preferably at a temperature in the range of 400° C. to 550° C.

Stream 10 is now divided into first process gas stream portion 11 and second process gas stream portion 12. Stream 11 is combined with bypass process air stream 3, to form process gas stream 13 which preferably contains less than 10% by volume of sulfur dioxide content and typically contains in the range of 6% to 10% by volume of sulfur dioxide content, together with excess free oxygen. Stream 13 is now passed into catalytic converter 14, in order to oxidize a major portion of the sulfur dioxide content to sulfur trioxide. Unit 14 preferably contains two beds 15 and 16 consisting of a suitable catalyst for the reaction, such as platinum or vanadium oxide deposited on a suitable carrier. Each of the beds 15 and 16 is of a suitable volume to achieve only partial conversion, in order to avoid excessive temperature rise due to the exothermic nature of the reaction, which could result in catalyst deterioration. The beds 15 and 16 are separated by partition 17, and the partially converted hot gas is withdrawn from below bed 15 as stream 18 for external cooling in an auxiliary steam boiler 19. Liquid water stream 20 is passed into boiler 19 and generated steam is removed via stream 21. Other suitable heat exchange mediums may be employed in unit 19 besides water stream 20. The resultant cooled process gas stream 22 is passed from unit 19 into unit 14 below partition 17, and then passes through bed 16 for further catalytic oxidation of sulfur dioxide to sulfur trioxide. The final hot process gas stream 23 withdrawn from unit 14 now contains sulfur trioxide together with a minor proportion of unconverted sulfur dioxide.

Stream 23 is now cooled prior to absorption of its sulfur trioxide content in liquid sulfuric acid. The cooling of stream 23 preferably takes place in heat exchange with the residual gas stream free of sulfur trioxide, prior to recycle of the residual gas stream to the process for further catalytic oxidation of its residual sulfur dioxide content to sulfur trioxide. Stream 23 is thus passed into heat exchanger 24, and the resulting cooled process gas stream 25 is produced at a temperature preferably below 200° C., and typically in the range of 100° C. to 200° C. Stream 25 is now passed into gas scrubbing tower 26, which may be provided with suitable internal means 27 for gas-liquid contact such as Raschig rings or other suitable packing, bubble cap trays, or sieve trays. Concentrated liquid sulfuric acid stream 28 is passed into unit 26 above section 27, and flows downwards countercurrent to the rising gas stream. The sulfur trioxide is absorbed from the gas phase into the liquid stream in section 27 with consequent formation of further sulfuric acid or oleum. The resultant liquid phase containing dissolved sulfur trioxide is withdrawn from unit 26 as stream 29, and may be recycled as stream 28 or passed to product utilization.

The residual gas stream 30 withdrawn overhead from unit 26 is now substantially free of sulfur trioxide, however stream 30 contains sulfur dioxide and is recycled for further catalytic oxidation. Stream 30 is heated in unit 24 to a suitable temperature for recycle and catalytic oxidation of sulfur dioxide to sulfur trioxide by heat exchange with stream 23. The resultant heated residual gas stream 31 is preferably at a temperature above 350° C., and is typically at a temperature in the range of 350° C. to 500° C. Stream 31 is now combined with stream 12, to form combined process gas stream 32 at a temperature preferably above 400° C. and typically at a temperature in the range of 400° C. to 525° C. Stream 32 is now passed into catalytic converter 33, which is similar in configuration and function to unit 14 described supra, except that substantially all of the sulfur dioxide content of stream 32 is converted to sulfur trioxide in unit 33. Thus, unit 33 is provided with a plurality of catalyst beds 34, 35 and 36, with interbed cooling to prevent excessive temperature rise being attained by the provision of cooling coils 37 and 38 between beds. A suitable heat exchange fluid is circulated through coils 37 and 38 via streams 39 and 40, which may consist of process air as described in U.S. Patent No. 3,147,074.

The resultant hot process gas stream 41 withdrawn from unit 33 below bed 36 contains sulfur trioxide and is substantially free of sulfur dioxide. Stream 41 is now cooled in heat exchanger 42 to a suitable temperature for absorption of the sulfur trioxide in concentrated sulfuric acid. A heat exchange fluid such as water is passed into unit 42 via stream 43, and heated fluid is withdrawn via stream 44. The resultant cooled process gas stream 45 withdrawn from unit 42 is preferably at a temperature below 200° C., and is typically at a temperature in the range of 100° C. to 200° C. Stream 45 is now passed into absorber 46, which is a unit having a configuration and function similar to unit 26 described supra. Thus, concentrated sulfuric acid stream 47 is passed into unit 46 above gas-liquid contact section 48, and absorbs substantially all of the sulfur trioxide from the rising gas phase. The resultant liquid phase of higher sulfur trioxide content is withdrawn via stream 49, and may be recycled via stream 47 or passed to product utilization. The residual gas phase stream 50, now substantially free of sulfur oxides, is discharged to atmosphere from unit 46 above section 48.

Numerous alternatives within the scope of the present invention will occur to those skilled in the art. Thus, the limitations and ranges of process variables such as gas stream temperatures enumerated supra merely represent preferred embodiments of the present invention, and it will be evident that the process is operable outside of these ranges and limitations, with the exception of the maximum limitation of the temperature of stream 6. The bypass air stream 3 may be omitted in some instances, in which case the total process oxygen requirement for combustion and sulfur dioxide oxidation will be admitted to the process via stream 2. Other means of cooling stream 6 instead of steam boiler 7 may be adopted in practice. Thus, in some instances stream 6 may be cooled by heat exchange with a process fluid similarly to stream 23, or with a conventional heat exchange medium other than liquid water. Similar considerations apply with respect to the cooling of stream 18, in that other cooling means besides steam boiler 19 may be adopted in practice. Unit 14 may contain only a single bed of catalyst, particularly in cases where stream 13 is of relatively low sulfur dioxide content. In other cases, unit 14 may contain more than two beds. Similar considerations apply with respect to unit 33, however in most cases three beds of catalyst will be sufficient to attain substantially complete sulfur dioxide oxidation in unit 33, and in some instances less than three beds may be provided in unit 33. The hot process gas stream 23 may be cooled prior to sulfur trioxide absorption by heat exchange with other process streams such as streams 1 or 3, or with liquid water or other heat exchange mediums, instead of by heat exchange with stream 30. In this case, stream 30 may be heated by alternative means or heat exchange prior to recycle as stream 31, or in some cases when stream 12 is at a sufficiently elevated temperature, stream 30 may be directly recycled as stream 31, in which case stream 12 will serve to heat stream 31 to requisite temperature for catalytic reaction by direct mixing. Sections 27 or 48 may be omitted in suitable instances, in which case units 26 and 46 would consist of spray towers. In other cases, gas-liquid contact may be attained by injecting streams 25 or 45 into a liquid pool or concentrated sulfuric acid solution. Other alternative gas-liquid contact procedures will occur to those skilled in the art. Interstage cooling between beds 34 and 35 or beds 35 and 36 may alternatively be attained by the provision of an internal partition in unit 33 similar to partition 17 of unit 14, combined with an external steam boiler similar to unit 19. A single sulfuric acid circulating system comprising a pump and acid cooler could be provided to furnish scrubbing acid to both units 26 and 46. In this case, streams 28 and 47 would be derived from a single cooled acid stream, and streams 29 and 49 could be combined prior to cooling and recycle for further gas scrubbing. In some cases streams 30 or 50 may contain entrained acid mist. In this case, the acid mist will be removed and recovered from the gas streams 30 or 50 by passing the gas stream through a suitable mist filter.

Finally, it is apparent that the process concept and sequence of the present invention is feasible and applicable in instances where a large-scale facility is required, and stream 10 is of such a large volume that it becomes practical to divide stream 10 into three or more portions. In this case, more than one portion of stream 10 would be subjected to partial catalytic conversion and sulfur trioxide absorption, followed by combination of the residual portions and final complete catalytic conversion of sulfur dioxide to sulfur trioxide in the combined gas stream. Alternatively, stream 10 may be divided into three portions, and the sulfur dioxide content of stream 32 may only be partially converted to sulfur trioxide. In this case, stream 50 will contain residual sulfur dioxide, and stream 50 would be combined with the third portion of stream 10, and the combined gas stream would be subjected to further catalytic conversion and sulfur trioxide absorption in additional separate process units. An example of an industrial application of the process of the present invention will now be described. In the example infra, process stream compositions are provided in terms of cubic feet per minute for each constituent.

*Example*

The process of the present invention was applied to a facility producing 200 short tons per day of sulfuric acid. The total catalyst volume required for beds 15 and 16 was 9600 liters, and the total catalyst volume required for beds 34, 35 and 36 was 13,850 liters. Following are the compositions and temperature of major process streams.

| Stream No. | Stream Composition, Cubic Feet Per Minute | | | | Stream Temp., °C. |
|---|---|---|---|---|---|
| | Sulfur Dioxide | Sulfur Trioxide | Oxygen | Nitrogen | |
| 1 | | | 2,090 | 7,910 | |
| 3 | | | 280 | 1,060 | |
| 6 | 1,040 | | 770 | 6,850 | 1,090 |
| 10 | 1,040 | | 770 | 6,850 | 520 |
| 13 | 694 | | 786 | 5,620 | 440 |
| 18 | | | | | 605 |
| 22 | | | | | 440 |
| 23 | 104 | 590 | 491 | 5,620 | 475 |
| 25 | 104 | 590 | 491 | 5,620 | 140 |
| 30 | 104 | | 491 | 5,620 | 75 |
| 31 | 104 | | 491 | 5,620 | 418 |
| 12 | 346 | | 264 | 2,290 | 520 |
| 32 | 450 | | 755 | 7,910 | 440 |
| 41 | 10 | 440 | 535 | 7,910 | 475 |
| 50 | 10 | | 535 | 7,910 | 75 |

In the example supra, overall conversion of sulfur dioxide to surfur trioxide was 99.1%, the required process air flow rate was only 50 cubic feet per minute per short ton of daily acid capacity, and the total volume of vanadium catalyst required was only 117.25 liters per short ton of daily acid capacity. These operating conditions represent a significant improvement over prior art procedures.

I claim:

1. A process for the production of sulfuric acid which comprises burning a sulfur-containing feed stream with an oxygen-containing gas, whereby a hot gas stream containing less than about 14% by volume of sulfur dioxide, and excess free oxygen, is produced at a temperature below 1200° C., cooling said hot gas stream to a temperature in the range of 400° to 550° C., dividing said gas stream into a first portion and a second portion, passing said first gas stream portion through first catalytic conversion means for the oxidation of sulfur dioxide to sulfur trioxide, whereby a major part of the sulfur dioxide content of said first gas stream portion is converted to sulfur trioxide, scrubbing said first gas stream portion with concentrated liquid sulfuric acid in first absorption means, whereby sulfur trioxide is absorbed into the liquid phase to form further sulfuric acid, combining the residual first gas stream portion with said second gas stream portion, passing the combined gas stream through second catalytic conversion means for the oxidation of sulfur dioxide to sulfur trioxide, whereby substantially all of the sulfur dioxide content of said combined gas stream is converted to sulfur trioxide, and scrubbing said combined gas stream with concentrated liquid sulfuric acid in second absorption means, whereby sulfur trioxide is absorbed into the liquid phase to form further sulfuric acid.

2. A process for the production of sulfuric acid which comprises burning a sulfur-containing feed stream with a first oxygen-containing gas, whereby a hot gas stream containing less than about 14% by volume of sulfur dioxide, and excess free oxygen, is produced at a temperature below 1200° C., cooling said hot gas stream to a temperature in the range of 400° to 550° C., dividing said gas stream into a first portion and a second portion, adding a second oxygen-containing gas to said first portion, passing said first gas stream portion through first catalytic conversion means for the oxidation of sulfur dioxide to sulfur trioxide, whereby a major part of the sulfur dioxide content of said first gas stream portion is converted to sulfur trioxide, scrubbing said first gas stream portion with concentrated liquid sulfuric acid in first absorption means, whereby sulfur trioxide is absorbed into the liquid phase to form further sulfuric acid, combining the residual first gas stream portion with said second gas stream portion, passing the combined gas stream through second catalytic conversion means for the oxidation of sulfur dioxide to sulfur trioxide, whereby substantially all of the sulfur dioxide content of said combined gas stream is converted to sulfur trioxide, and scrubbing said combined gas stream with concentrated liquid sulfuric acid in second absorption means, whereby sulfur trioxide is absorbed into the liquid phase to form further sulfuric acid.

3. A process for the production of sulfuric acid which comprises burning a sulfur-containing feed stream with an oxygen-containing gas, whereby a hot gas stream containing less than about 14% by volume of sulfur dioxide, and excess free oxygen, is produced at a temperature below 1200° C., cooling said hot gas stream to a temperature in the range of 400° to 550° C., dividing the cooled gas stream into a first portion and a second portion, passing said first gas stream portion through first catalytic conversion means for the oxidation of sulfur dioxide to sulfur trioxide, whereby a major part of the sulfur dioxide content of said first gas stream portion is converted to sulfur trioxide, cooling said first gas stream portion, scrubbing said first gas stream portion with concentrated liquid sulfuric acid in first absorption means, whereby sulfur trioxide is absorbed into the liquid phase to form further sulfuric acid, combining the residual first gas stream portion with said second gas stream portion, passing the combined gas stream through second catalytic conversion means for the oxidation of sulfur dioxide to sulfur trioxide, whereby substantially all of the sulfur dioxide content of said combined gas stream is converted to sulfur trioxide, cooling the resulting combined gas stream, and scrubbing said combined gas stream with concentrated liquid sulfuric acid in second absorption means, whereby sulfur trioxide is absorbed into the liquid phase to form further sulfuric acid.

4. A process for the production of sulfuric acid which comprises burning a sulfur-containing feed stream with a first oxygen-containing gas, whereby a hot gas stream containing less than about 14% by volume of sulfur dioxide, and excess free oxygen, is produced at a temperature below 1200° C., cooling said hot gas stream to a temperature in the range of 400° to 550° C., dividing the cooled gas stream into a first portion and a second portion, adding a second oxygen-containing gas to said first portion, passing said first gas stream portion through first catalytic conversion means for the oxidation of sulfur dioxide to sulfur trioxide, whereby a major part of the sulfur dioxide content of said first gas stream portion is converted to sulfur trioxide, cooling said first gas stream portion in heat exchange means, scrubbing said first gas stream portion with concentrated liquid sulfuric acid in first absorption means, whereby sulfur trioxide is absorbed into the liquid phase to form further sulfuric acid, passing the residual first gas stream portion through said heat exchange means, whereby said residual first gas stream portion is heated, combining the heated residual first gas stream portion with said second gas stream portion, passing the combined gas stream through second catalytic conversion means for the oxidation of sulfur dioxide to sulfur trioxide, whereby substantially all of the sulfur dioxide content of said combined gas stream is converted to sulfur trioxide, cooling said combined gas stream, and scrubbing said combined gas stream with concentrated liquid sulfuric acid in second absorption means, whereby sulfur trioxide is absorbed into the liquid phase to form further sulfuric acid.

5. A process for the production of sulfuric acid which comprises burning a sulfur-containing feed stream with air, whereby a hot gas stream containing less than about 14% by volume of sulfur dioxide, and excess free oxygen, is produced at a temperature below 1200° C., cooling said gas stream to a reduced temperature below about 550° C. and above 400° C. by heat exchange with liquid water, whereby said liquid water is vaporized to steam, dividing the cooled gas stream into a first portion and a second portion, passing said first gas stream portion through first catalytic conversion means for the oxidation of sulfur dioxide to sulfur trioxide, whereby a major part of the sulfur dioxide content of said first gas stream portion is converted to sulfur trioxide, cooling said first gas stream portion to a temperature below 200° C., scrubbing said first gas stream portion with concentrated liquid sulfuric acid in first absorption means, whereby sulfur trioxide is absorbed into the liquid phase to form further sulfuric acid, heating the residual first gas stream portion to a temperature above 350° C., combining the residual first gas stream portion with said second gas stream portion, whereby a combined gas stream is formed at a temperature above 400° C., passing the combined gas stream through second catalytic conversion means for the oxidation of sulfur dioxide to sulfur trioxide, whereby substantially all of the sulfur dioxide content of said combined gas stream is converted to sulfur trioxide, cooling the resulting combined gas stream to a temperature below 200° C., and scrubbing the combined gas stream with concentrated liquid sulfuric acid in second absorption means, whereby sulfur trioxide is absorbed into the liquid phase to form further sulfuric acid.

6. A process for the production of sulfuric acid which comprises burning a sulfur-containing feed stream with a first oxygen-containing gas, whereby a hot gas stream containing less than about 14% and more than 10% by volume of sulfur dioxide content, and excess free oxygen, is produced at a temperature below 1200° C., cooling said hot gas stream to a reduced temperature below about 550° C. and above 400° C. by heat exchange with liquid water, whereby said liquid water is vaporized to steam, dividing the cooled gas stream into a first portion and a second portion, adding a second oxygen-containing gas to said first portion, whereby the sulfur dioxide content of said first portion is reduced to less than 10% by volume, passing said first gas stream portion through first catalytic conversion means for the oxidation of sulfur dioxide to sulfur trioxide, whereby a major part of the sulfur dioxide content of said first gas stream portion is converted to sulfur trioxide, cooling said first gas stream portion in heat exchange means to a temperature below 200° C., scrubbing said first gas stream portion with concentrated liquid sulfuric acid in first absorption means, whereby sulfur trioxide is absorbed into the liquid phase to form further sulfuric acid, heating the residual first gas stream portion to a temperature above 350° C. in said heat exchange means, combining the residual first gas stream portion with said second gas stream portion, whereby a combined gas stream is formed at a temperature above 400° C., passing the combined gas stream through second catalytic conversion means for the oxidation of sulfur dioxide to sulfur trioxide, whereby substantially all of the sulfur dioxide content of said combined gas stream is converted to sulfur trioxide, cooling the resulting combined gas stream to a temperature below 200° C., and scrubbing the combined gas stream with concentrated liquid sulfuric acid in second absorption means, whereby sulfur trioxide is absorbed into the liquid phase to form further sulfuric acid.

7. A process for the production of sulfuric acid which comprises burning a sulfur-containing feed stream with air, whereby a hot gas stream containing less than about 14% by volume of sulfur dioxide, and excess free oxygen, is produced at a temperature in the range of 600° C. to 1200° C., cooling said hot gas stream to a temperature in the range of 400° C. to 550° C. by heat exchange with liquid water, whereby said liquid water is vaporized to steam, dividing the cooled gas stream into a first portion and a second portion, passing said first gas stream portion through first catalytic conversion means for the oxidation of sulfur dioxide to sulfur trioxide, whereby a major part of the sulfur dioxide content of said first gas stream portion is converted to sulfur trioxide, cooling said first gas stream portion to a temperature in the range of 100° C. to 200° C., scrubbing said first gas stream portion with concentrated liquid sulfuric acid in first absorption means, whereby sulfur trioxide is absorbed into the liquid phase to form further sulfuric acid, heating the residual first gas stream portion to a temperature in the range of 350° C. 500° C., combining the residual first gas stream portion with said second gas stream portion, whereby a combined gas stream is formed at a temperature in the range of 400° C. to 525° C., passing the combined gas stream through second catalytic conversion means for the oxidation of sulfur dioxide to sulfur trioxide, whereby substantially all of the sulfur dioxide content of said combined gas stream is converted to sulfur trioxide, cooling the resulting combined gas stream to a temperature in the range of 100° C. to 200° C., and scrubbing the combined gas stream with concentrated liquid sulfuric acid in second absorption means, whereby sulfur trioxide is absorbed into the liquid phase to form further sulfuric acid.

8. A process for the production of sulfuric acid which comprises burning a sulfur-containing feed stream with a first air stream, whereby a hot gas stream containing in the range of 10% to 14% by volume of sulfur dioxide content and excess free oxygen is produced at a temperature in the range of 600° C. to 1200° C., cooling said hot gas stream to a temperature in the range of 400° C. to 550° C. by heat exchange with liquid water, whereby said liquid water is vaporized to steam, dividing the cooled gas stream into a first portion and a second portion, adding a second air stream to said first portion, whereby the sulfur dioxide content of said first portion is reduced to the range of 6% to 10% by volume, passing said first gas stream portion through first catalytic conversion means for the oxidation of sulfur dioxide to sulfur trioxide, whereby a major part of the sulfur dioxide content of said first gas stream portion is converted to sulfur trioxide, cooling said first gas stream portion in heat exchange means to a temperature in the range of 100° C. to 200° C., scrubbing said first gas stream portion with concentrated liquid sulfuric acid in first absorption means, whereby sulfur trioxide is absorbed into the liquid phase to form further sulfuric acid, heating the residual first gas stream portion in said heat exchange means to a temperature in the range of 350° C. to 500° C., combining the residual first gas stream portion with said second gas stream portion, whereby a combined gas stream is formed at a temperature in the range of 400° C. to 525° C., passing the combined gas stream through second catalytic conversion means for the oxidation of sulfur dioxide to sulfur trioxide, whereby substantially all of the sulfur dioxide content of said combined gas stream is converted to sulfur trioxide, cooling the resulting combined gas stream to a temperature in the range of 100° C. to 200° C., and scrubbing the combined gas stream with concentrated liquid sulfuric acid in second absorption means, whereby sulfur trioxide is absorbed into the liquid phase to form further sulfuric acid.

9. The process of claim 8, in which said sulfur-containing feed stream comprises elemental sulfur.

References Cited
UNITED STATES PATENTS

| | | | |
|---|---|---|---|
| 2,023,203 | 12/1935 | Merriam | 23—176 |
| 3,142,536 | 7/1964 | Guth et al. | 23—175 |
| 3,259,459 | 7/1966 | Moller | 23—176 |

EARL C. THOMAS, *Primary Examiner.*

OSCAR R. VERTIZ, *Examiner.*

A. GREIF, *Assistant Examiner.*